(12) United States Patent
Boeck

(10) Patent No.: US 6,416,246 B1
(45) Date of Patent: Jul. 9, 2002

(54) CONNECTING ARRANGEMENT FOR TWO ROTOR DISKS OF AN AXIAL-FLOW TURBOMACHINE

(75) Inventor: Alexander Boeck, Zossen (DE)

(73) Assignee: Rolls-Royce Deutschland Ltd & Co KG, Dahlewitz (DE)

( * ) Notice: Subject to any disclaimer, the term of this patent is extended or adjusted under 35 U.S.C. 154(b) by 0 days.

(21) Appl. No.: 09/622,030
(22) PCT Filed: Dec. 9, 1999
(86) PCT No.: PCT/EP99/09688
§ 371 (c)(1),
(2), (4) Date: Jan. 29, 2001
(87) PCT Pub. No.: WO00/36279
PCT Pub. Date: Jun. 22, 2000

(30) Foreign Application Priority Data

Dec. 14, 1998 (DE) .......................... 198 57 554

(51) Int. Cl.⁷ .................................................. F16B 1/00
(52) U.S. Cl. ................ 403/337; 403/408.1; 416/198 R
(58) Field of Search ................................ 403/338, 337, 403/42, 303, 314, 408.1; 416/198 R

(56) References Cited

U.S. PATENT DOCUMENTS

| | | | |
|---|---|---|---|
| 2,614,796 A | 10/1952 | Miller | |
| 2,772,853 A | 12/1956 | Woodworth | |
| 3,688,371 A | * 9/1972 | Koff | 416/198 R X |
| 3,888,602 A | * 6/1975 | Nichols et al. | 416/198 R |

FOREIGN PATENT DOCUMENTS

| | | |
|---|---|---|
| BE | 537643 | 5/1955 |
| DE | 944 646 | 6/1956 |
| DE | 17556 | 10/1959 |
| DE | 2507695 | 8/1975 |
| DE | 3444586 | 7/1985 |

* cited by examiner

Primary Examiner—Lynne H. Browne
Assistant Examiner—John R. Cottingham
(74) Attorney, Agent, or Firm—The Law Offices of Timothy J. Klima

(57) ABSTRACT

This invention relates to an arrangement for the connection of two rotor disks of an axial-flow turbomachine arranged one behind the other, more particularly two turbine rotor disks of an aero-engine, in which connecting arms protruding from the rotor disks in the axial direction and facing each other are separably joined together by way of several bolts distributed along their circumference. According to the present invention, these bolts are arranged in the radial direction. In a preferential embodiment, each connecting arm features an alternation of prongs extending in the axial direction and of adjacent recesses, with the prongs of the connecting arm of one rotor disk engaging the recesses of the connecting arm of the other rotor disk. A retaining ring subdivided into individual ring segments lodges against the inner side of the connecting arms and is connected to at least one of the two connecting arms by means of bolts. The ring segments have a trapezoidal cross-section and, as viewed in the circumferential direction, their fronts lodge alternately against projections of the prongs, said projections extending inwards in the radial direction and embracing the ring segments.

4 Claims, 3 Drawing Sheets

CONNECTING ARRANGEMENT FOR TWO ROTOR DISKS OF AN AXIAL-FLOW TURBOMACHINE

Figure 1:
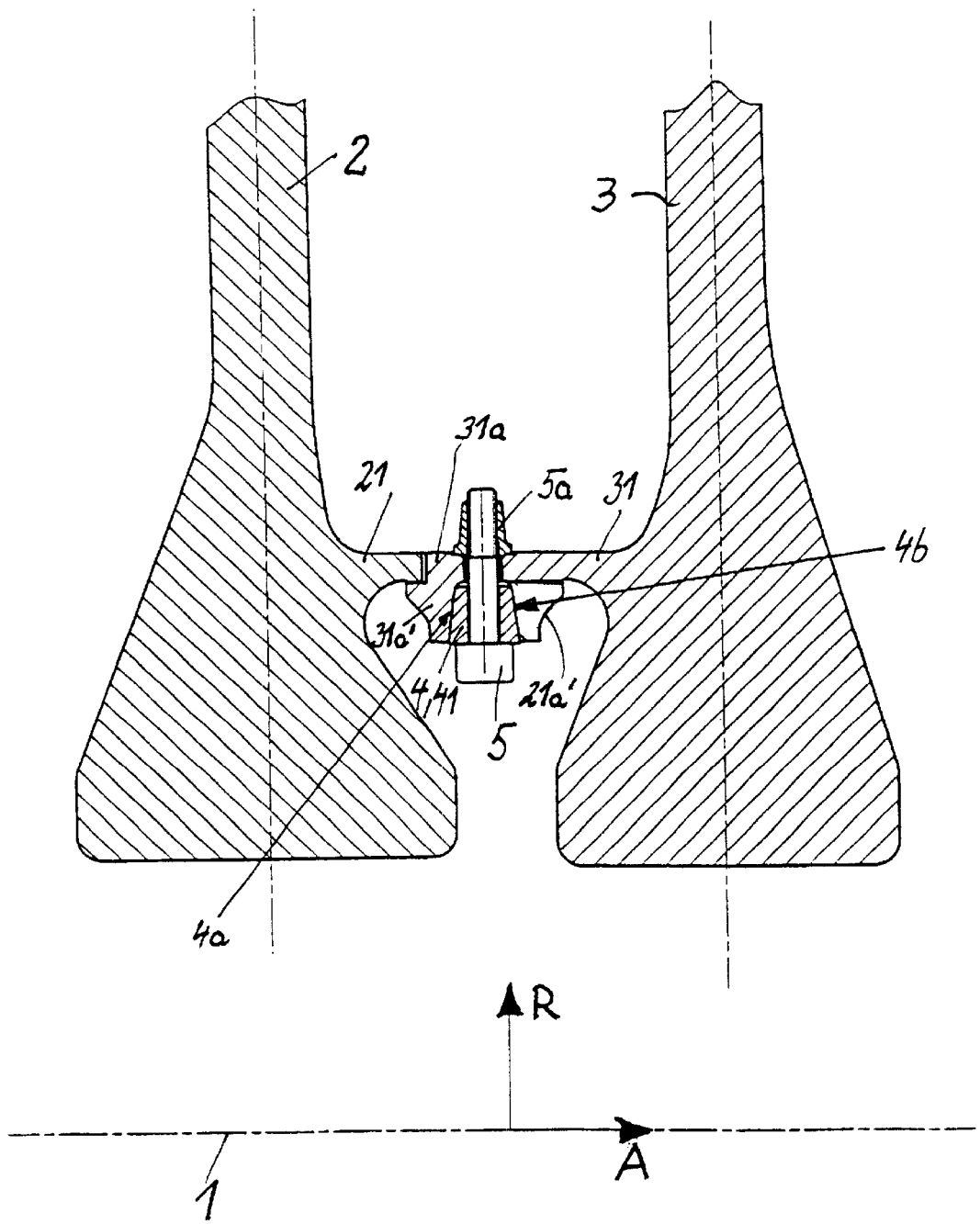

This application is the national phase of international application PCT/EP99/09688 filed Dec. 9, 1999 which designated the U.S.

This invention relates to an arrangement for the connection of two rotor disks of an axial-flow turbomachine arranged one behind the other, more particularly two turbine rotor disks of an aero-engine, in which connecting arms protruding from the rotor disks essentially in the axial direction and facing each other are separably joined by way of several, pin-type fasteners, in particular bolts, distributed along the circumference. For background art, reference is made to Patent Specification DE 34 44 586 A1, for example.

For safety reasons, it is beneficial to provide a labyrinth seal between the two rotor disks of a two-stage high-pressure turbine of an aero-engine, for example, to prevent the hot gas passing across the blades of these rotor disks from entering the area between the rotor disks after whatever kind of failure of the total system. Such a labyrinth seal is realized in the aforementioned DE 34 44 586 A1 in the form of an arrangement termed "mini-disc" (this being an additional, small intermediate disk).

Since the provision of such a labyrinth seal, for example in the form of the aforesaid mini-disc, will inevitably close off the area between the rotor disks to the outside, the required mechanical connection of the rotor disks must be made from the inside, i.e. from the rotational axis of the axial-flow turbomachine—with a separable bolted joint commonly being applied for this purpose.

In the prior art (and as demonstrated in the aforementioned Patent Specification DE 34 44 586 A1), the rotor disks are bolted together by a multitude of connecting bolts which extend in the axial direction of the turbomachine, said connecting bolts (or pin-type, separable fasteners in general) joining the two connecting arms protruding from the rotor disks essentially in the axial direction and facing each other. The circumferential connecting flange formed by the aforesaid connecting arms must be designed relatively stiff to account for the dynamic loads arising, this constraint resulting in relatively large geometrical dimensions. Furthermore, connecting bolts whose solidity is commensurate with this constraint must be provided. Since these connecting bolts or fasteners must moreover be installed, or threaded in, from the inside, the axial spacing of the two rotor disks is to be relatively large, this circumstance directly affecting the overall length of the axial-flow turbomachine or the aero-engine and increasing its mass unfavourably.

In a broad aspect, the present invention provides a remedy for the problems described above.

It is a particular object of the present invention to provide an arrangement in which the fasteners are essentially oriented in the radial direction, that is to say vertical to the axial direction. Further objects and advantages of the present invention are cited in the subclaims.

According to the present invention, the pin-type, separable fasteners, in particular the connecting bolts, extend essentially in the radial direction of the axial-flow turbomachine when they are provided or installed in the position in which they join the two connecting arms together, i.e. that said fasteners can simply be fitted or screwed in from the inside, that is to say from and vertical to the rotational axis, into the connecting flange formed by the two rotor disks. It is apparent that this radial orientation of the fasteners will allow for a considerably shorter axial distance of the rotor disks than in the case of an axial orientation of the fasteners.

It is apparent that appropriate bolt nuts or similar means must be provided on the rear side of the connecting flange when bolts are used as fasteners, but these nuts can be fitted suitably, preferably on one of the two connecting flanges, already before the assembly or the installation of the two rotor disks into the axial-flow turbomachine. In this context, it should be noted that the pin-type fasteners may also be fitted into the connecting flange radially from the outside if the space between the two rotor disks is accessible from the outside.

The two rotor disks with the separable, pin-type fasteners orientated in accordance with the present invention are most easily connected with and secured against rotation relative to each other if the annular connecting arms at least partially overlap each other. A distinctly enhanced joint is, however, provided by the features expressed in the subclaims. A correspondingly designed, preferred embodiment is described in the following figures providing further details of the present invention. On the drawings, FIG. 1 is an axial half-section of an arrangement for the connection of two rotor disks in accordance with the present invention, FIG. 2 is a perspective side view in accordance with arrowhead X of FIG. 1, and FIG. 3 is a spatial top view on the connection arrangement in accordance with the view of FIG. 1, i.e. from the rotational axis of the axial-flow turbomachine.

Figure 2:
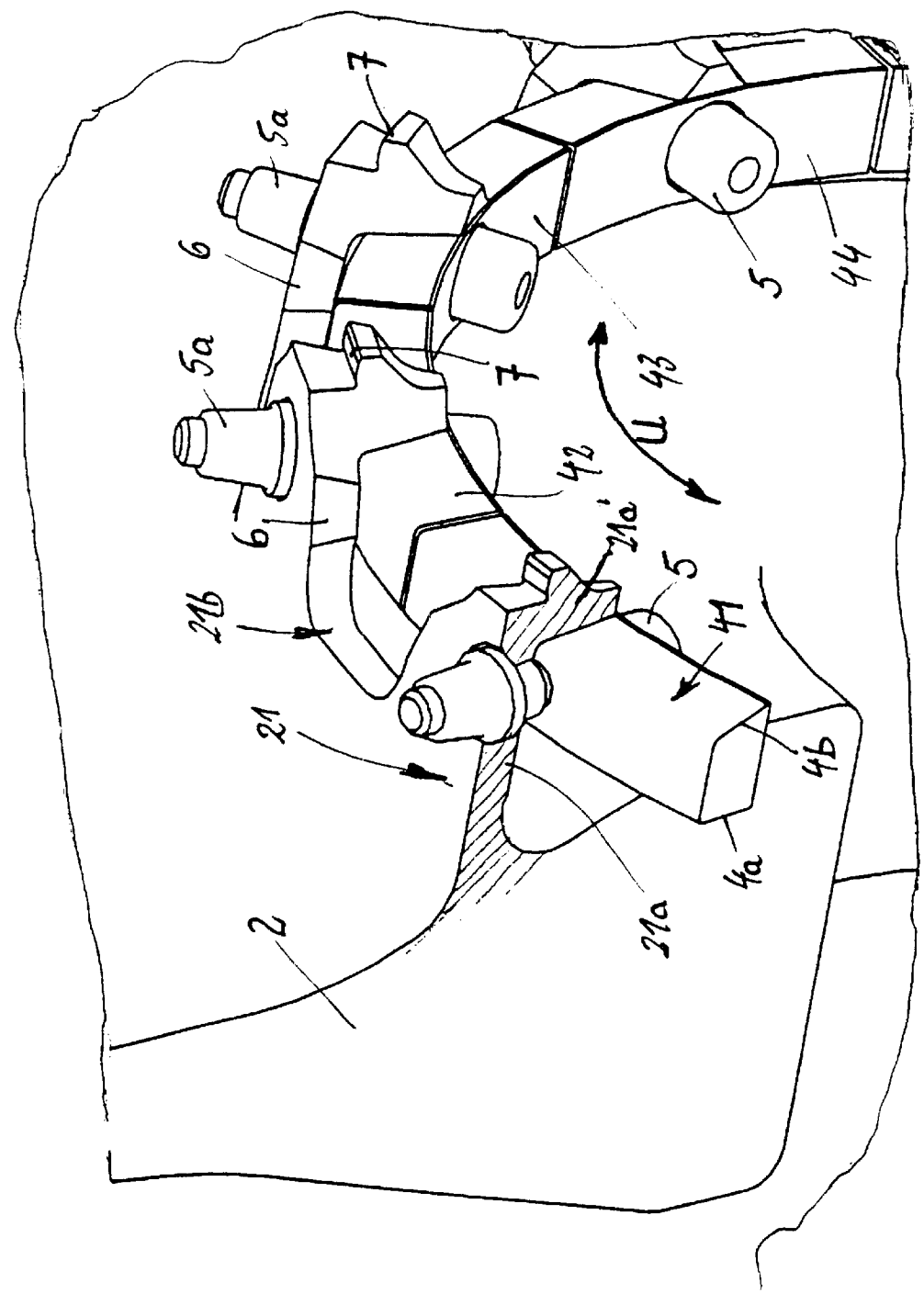
Figure 3:
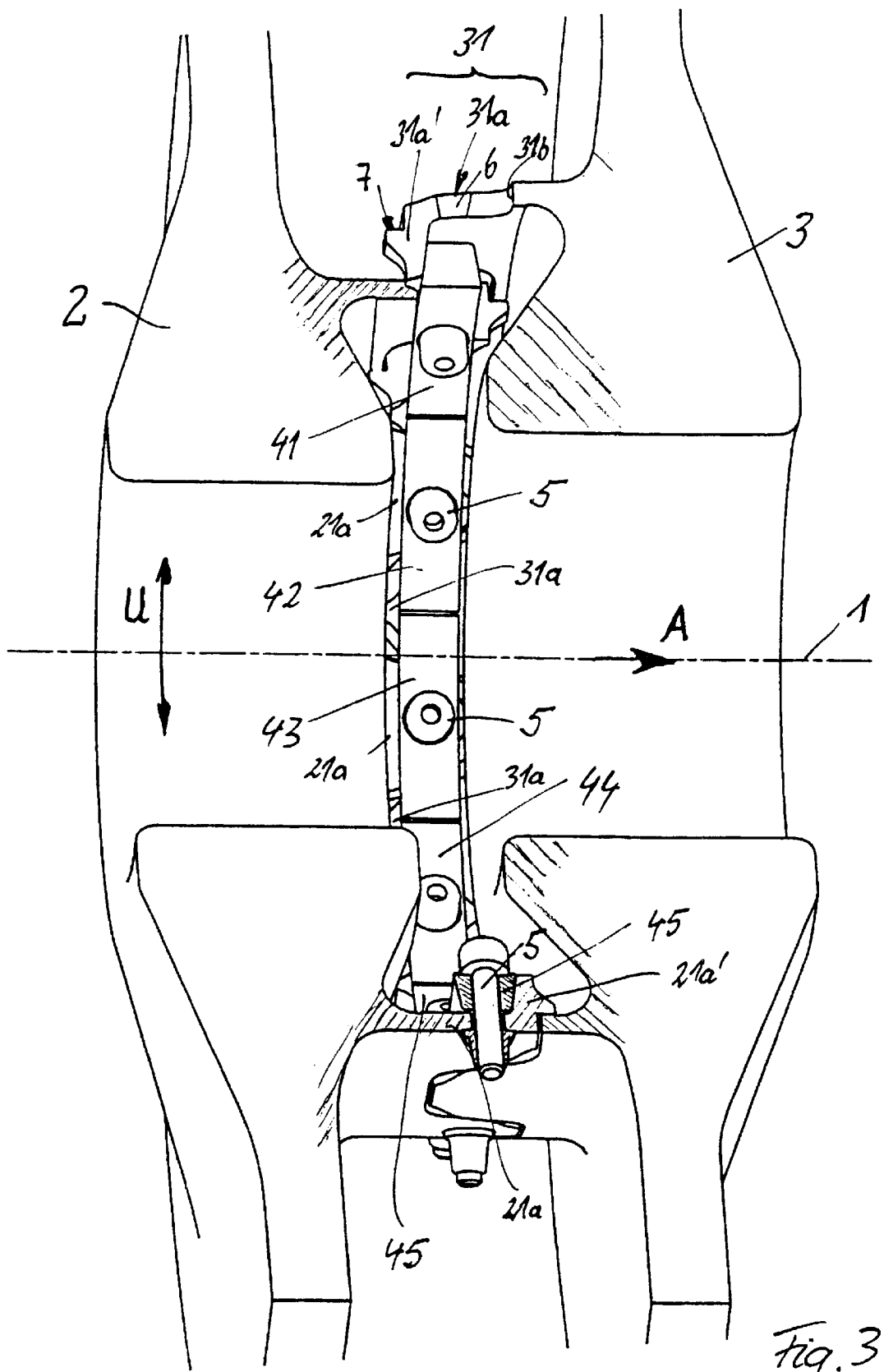

Reference numeral 1 indicates the rotational axis of an axial-flow turbomachine not further shown, cf. FIGS. 1, 3. The two rotor disks 2, 3 rotate about this rotational axis and carry blades on their circumference that are not further shown and through which the working gas of the turbomachine is passed—more particularly said turbomachine is an aero-engine and said rotor disks 2, 3 are the turbine disks of a two-stage high-pressure turbine. The axial direction of this turbomachine which is parallel to the rotational axis 1 and in which the working gas flows is indicated by arrowhead A, and the radial direction which is vertical to the rotational direction is indicated by arrowhead R.

As usual, the two rotor disks 2, 3 shall be connected and secured against rotation relative to each other and, in addition, be restrainable with each other in the axial direction A. To satisfy this requirement, the connection arrangement detailed in the following is provided:

Connecting arms 21, 31 protrude from the opposing faces of the rotor disks 2, 3, these connecting arms facing each other, being essentially at the same level as viewed in the radial direction R and forming a connecting flange which is circumferential about the rotational axis 1. As becomes apparent from the FIGS. 3 and 2, in particular, each connecting arm 21 or 31 as viewed in the circumferential direction U features an alternation of the prongs 21a or 31a and of the adjacent recesses 21b or 31b, respectively, with the prongs protruding essentially in the axial direction A. The arrangement is made such that the prongs 21a of the connecting arm 21 of the rotor disk 2 engage the recesses 31b of the connecting arm 31 of the rotor disk 3 while the prongs 31a of the connecting arm 31 of the rotor disk 3 engage the recesses 21b of the connecting arm 21 of the rotor disk 2. An anti-rotation connection of the two rotor disks 2 and 3 will already be provided by this arrangement alone.

This anti-rotation connection must, however, be secured in the axial direction A, as well, i.e. the rotor disks 2, 3 must be held against each other and, in addition, be restrainable with each other. For this purpose, a retaining ring 4 which is divided into or composed of the individual ring segments 41, 42, 43, 44, 45, . . . is provided which abuts the inner side of the connecting arms 21, 31 as viewed in the radial direction R and which is connected to the connecting arm 21 by way of pin-type fasteners 5 extending essentially in the radial direction R. In this arrangement, each individual ring segment 41, 42, . . . 45, . . . is connected with one each prong 21a of the connecting arm 21, i.e. the number of ring segments 41, 42, is equal to the number of prongs 21a provided on the connecting arm 21, with attention being drawn to the obvious fact that more than the five ring segments 41, 42, etc. illustrated herein will be required and consequently be provided to make up a full retaining ring 4.

As becomes apparent from the FIG. 1, 2 in particular, the ring segments 41, 42, 43, . . . , etc. of the retaining ring 4 have an essentially trapezoidal cross-section and, as viewed in the circumferential direction U, lodge with their opposite fronts 4a, 4b alternately against the projections 21a', 31a ' of the prongs 21a, 31a, said projections extending inwards in the radial direction R and embracing the ring segments 41, 42, etc. or the retaining ring 4, respectively. As illustrated in FIG. 3 in particular and also in the FIG. 2, 1, this arrangement provides for fixation of the two rotor disks 2, 3 relative to each other in the axial direction A, with each front 4b (shown right in the figures) of the ring segments 41 or 42 or 43, etc. that faces the rotor disk 3 resting at its centre on one of the projections 21a' of the rotor disk 2 and with each front 4a (shown left in the figures) of the ring segments 41 or 42 or 43, etc. that faces the rotor disk 3 resting at its ends on one of the projections 31a' of the rotor disk 3 or its prongs 31a, respectively.

As already mentioned in the above, each ring segment 41, 42, 43, . . . , . . . is retained to the connecting arm 21 or on one prong 21a of the connecting arm, respectively, by means of a separable, pin-type fastener 5, with each pin-type fastener 5 extending in the radial direction R. In particular, these fasteners 5 are bolts which are passed from the inside, i.e. from the rotational axis 1, through undesignated through-holes in the ring segments 41 or 42 or 43, etc. and in the prongs 21a and are screwed into the bolt nuts 5a provided on the rear or on the exterior of the connecting arm 21. Since the ring segments 41, 42, etc. have an essentially trapezoidal cross-section which slightly decreases in the radial direction R and, hence, towards the connecting arms 21 and 31, the two rotor disks 2, 3 will incidentally be optimally restrained with each other in the axial direction A when the fasteners 5 or the bolts, respectively, are tightened to the corresponding bolts nuts 5a. In this context, attention is drawn to the fact that the fasteners 5 alone would prove an anti-rotation between the two rotor disks 2, 3 if each of the fasteners 5 would at the same time be passed through both connecting arms 21, 31, an arrangement not provided by the embodiment here illustrated. The relevant fact for the present invention is that the separable, pin-type fasteners 5 extend essentially in the radial direction R, i.e. the larger-size longitudinal extension of these fasteners 5 is in the radial direction R (at least essentially, and precisely in the embodiment here shown). As already detailed in the above before the description of the preferential embodiment, a minimal clearance or installation area will accordingly be sufficient in the axial direction between the two rotor disks 2, 3 to enable installation of these fasteners 5 (preferably from the inside).Mating faces 6, 7 are provided on the prongs 21a, 31a and/or on the recesses 21b, 31b, whereby the mating faces 6, 7 on the connecting arm 21 of the rotor disk 2 interact with the corresponding mating faces 6, 7 on the connecting arm 31 of the rotor disk 3 to ensure an optimum fit of the connection between the two rotor disks 2, 3. In this arrangement, the mating faces 6 provided on the sides of the prongs 21a, 31a or of the recesses 21b, 31b essentially act in the circumferential direction U, the mating faces 7 essentially in the radial direction R, but modifications to this detail and a plurality of other details, in particular of design, other than those described herein may be made to the embodiment of this invention without departing from the inventive concept.

The merit of the connection arrangement for two rotor disks 2, 3 of an axial-flow turbomachine arranged one behind the other in accordance with the present invention always lies in the fact that the spacing between these rotor disks 2, 3 as measured in the axial direction A need only be insignificantly larger than the width dimension of the fasteners 5 or, here, of the retaining ring 4 or the ring segments 41, 42, etc. Should any of the fasteners 5 or bolts fail, neither the corresponding ring segment 41 or 42, etc. nor the failed bolt itself will as an advantageous aspect be expelled since they are both retained by the connecting arms 21, 31. Moreover, the connection between the rotor disks 2, 3 here described will be maintained even if failure of several bolts or fasteners 5 should occur (an improbable case anyhow).

List of reference numerals:

| | |
|---|---|
| 1 | Rotational axis |
| 2 | Rotor disk (on the left in the figures) |
| 21 | Connecting arm of 2 |
| 21a | Prong |
| 21a' | Projection of 21a (extending inwards in direction R) |
| 21b | Recess in 21 |
| 3 | Rotor disk (on the right in the figures) |
| 31 | Connecting arm of 3 |
| 31a | Prong |
| 31a' | Projection of 31a (extending inwards in direction R) |
| 31b | Recess in 31 |
| 4 | Retaining ring |
| 4a | (Left-hand) front of 4 or of 41, 42, etc., respectively |
| 4b | (Right-hand) front of 4 or of 41, 42, etc., respectively |
| 41 | Ring segment |
| 42, 43 | Ring segments |
| 44, 45 | Ring segments |
| 5 | Pin-type fastener, in particular bolt |
| 5a | Bolt nut |
| 6 | Mating face |
| 7 | Mating face |
| A | Axial direction |
| R | Radial direction |
| U | Circumferential direction |

What is claimed is:

1. A connection arrangement for two rotor disks of an axial-flow turbomachine arranged one behind the other, in which connecting arms protruding essentially in an axial direction and facing each other are separably joined by several, pin-type fasteners distributed along their circumference, with the fasteners being arranged essentially in a radial direction vertical to the axial direction, wherein each connecting arm, as viewed in a circumferential direction features an alternation of prongs and of adjacent recesses, respectively, with the prongs protruding essentially in the axial direction; and the prongs of the connecting arm of one rotor disk engage the recesses of the connecting arm of the other rotor disk.

2. A connection arrangement as in claim 1, wherein a retaining ring subdivided into individual ring segments lodges against the inner side of the connecting arms as viewed in the radial direction and is connected to at least one of the connecting arms by way of fasteners extending essentially in the radial direction.

3. A connection arrangement as in claim 2, wherein the ring segments of the retaining ring have an essentially trapezoidal cross-section and, when viewed in the circumferential direction, lodge with their fronts alternately on projections of the prongs, said projections extending inwards in the radial direction and embracing the ring segments.

4. A connection arrangement as in claim 1, wherein mating faces are provided on at least one of the prongs and the recesses, with the mating faces on the connecting arm of one rotor disk interacting with corresponding mating faces on the connecting arm of the other rotor disk.

* * * * *